(12) United States Patent
Garg et al.

(10) Patent No.: US 12,195,033 B2
(45) Date of Patent: Jan. 14, 2025

(54) TECHNIQUES FOR DETECTING ROAD BLOCKAGES AND GENERATING ALTERNATIVE ROUTES

(71) Applicant: Zoox, Inc., Foster City, CA (US)

(72) Inventors: Lakshay Garg, Redwood, CA (US); Ravi Gogna, San Jose, CA (US); Joona Markus Petteri Kiiski, Cupertino, CA (US); Caili Li, Castro Valley, CA (US)

(73) Assignee: Zoox, Inc., Foster City, CA (US)

( * ) Notice: Subject to any disclaimer, the term of this patent is extended or adjusted under 35 U.S.C. 154(b) by 236 days.

(21) Appl. No.: 17/459,829

(22) Filed: Aug. 27, 2021

(65) Prior Publication Data

US 2023/0067887 A1 Mar. 2, 2023

(51) Int. Cl.
*B60W 30/18* (2012.01)
*B60W 60/00* (2020.01)

(52) U.S. Cl.
CPC .... *B60W 60/001* (2020.02); *B60W 30/18163* (2013.01); *B60W 2552/10* (2020.02)

(58) Field of Classification Search
CPC ......... B60W 60/001; B60W 30/18163; B60W 2552/10; B60W 2552/50; B60W 60/007
See application file for complete search history.

(56) References Cited

U.S. PATENT DOCUMENTS

| 8,849,494 B1* | 9/2014 | Herbach | B60W 60/0015 701/24 |
| 2016/0282874 A1* | 9/2016 | Kurata | G05D 1/0223 |
| 2018/0257643 A1* | 9/2018 | Kroop | B60W 30/09 |
| 2018/0257661 A1* | 9/2018 | Kroop | G08G 1/165 |
| 2018/0314259 A1 | 11/2018 | Shami | |
| 2018/0373941 A1* | 12/2018 | Kwant | G08G 1/0145 |
| 2020/0409363 A1 | 12/2020 | Gogna et al. | |
| 2020/0409368 A1 | 12/2020 | Caldwell et al. | |

(Continued)

FOREIGN PATENT DOCUMENTS

KR 20210066956 A 6/2021
WO WO2019125911 A1 6/2019

OTHER PUBLICATIONS

PCT Search Report and Written Opinion mailed Dec. 9, 2022 for PCT Application No. PCT/US2022/041490, 12 pages.

*Primary Examiner* — Ashley L Redhead, Jr.
(74) *Attorney, Agent, or Firm* — Lee & Hayes, P.C.

(57) ABSTRACT

The present disclosure involves systems and methods for detecting road blockages and generating alternative routes. In some cases, a system detects, based at least in part on sensor data associated with an autonomous vehicle, a portion of an environment that impedes a planned path of the autonomous vehicle. The system determines a semantic classification associated with the portion of the environment and transmits a re-routing request comprising the semantic classification to one or more remote computing devices. The system receives an instruction associated with navigating the autonomous vehicle around the portion of the environment from the remote computing devices, where the instruction includes an alternative route determined from a plurality of alternative routes. The system further controls the autonomous vehicle to navigate around the portion of the environment based at least in part on the instruction.

20 Claims, 6 Drawing Sheets

(56) References Cited

U.S. PATENT DOCUMENTS

| | | | |
|---|---|---|---|
| 2021/0094539 A1* | 4/2021 | Beller | B60W 30/095 |
| 2022/0019225 A1* | 1/2022 | Foley | G05D 1/0214 |
| 2022/0128989 A1* | 4/2022 | Ghorbanian-Matloob | G06V 20/58 |
| 2022/0185315 A1* | 6/2022 | Falk | G01C 21/3461 |
| 2022/0194415 A1* | 6/2022 | Liu | G06F 16/9024 |

* cited by examiner

TECHNIQUES FOR DETECTING ROAD BLOCKAGES AND GENERATING ALTERNATIVE ROUTES

BACKGROUND

An autonomous vehicle may navigate along designated routes or between waypoints. For example, when a control system receives a request from a user device to pick up a user at a location and provide transport to a destination location, the autonomous vehicle may receive, from the control system, instructions to navigate from the pickup location to the destination location. However, in some circumstances, a planned path of the autonomous vehicle navigating to the pickup location or the destination location may be impeded, such as by another vehicle or by a construction site. This may cause problems, such as delaying the autonomous vehicle or causing the autonomous vehicle to block the flow of traffic.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1A:
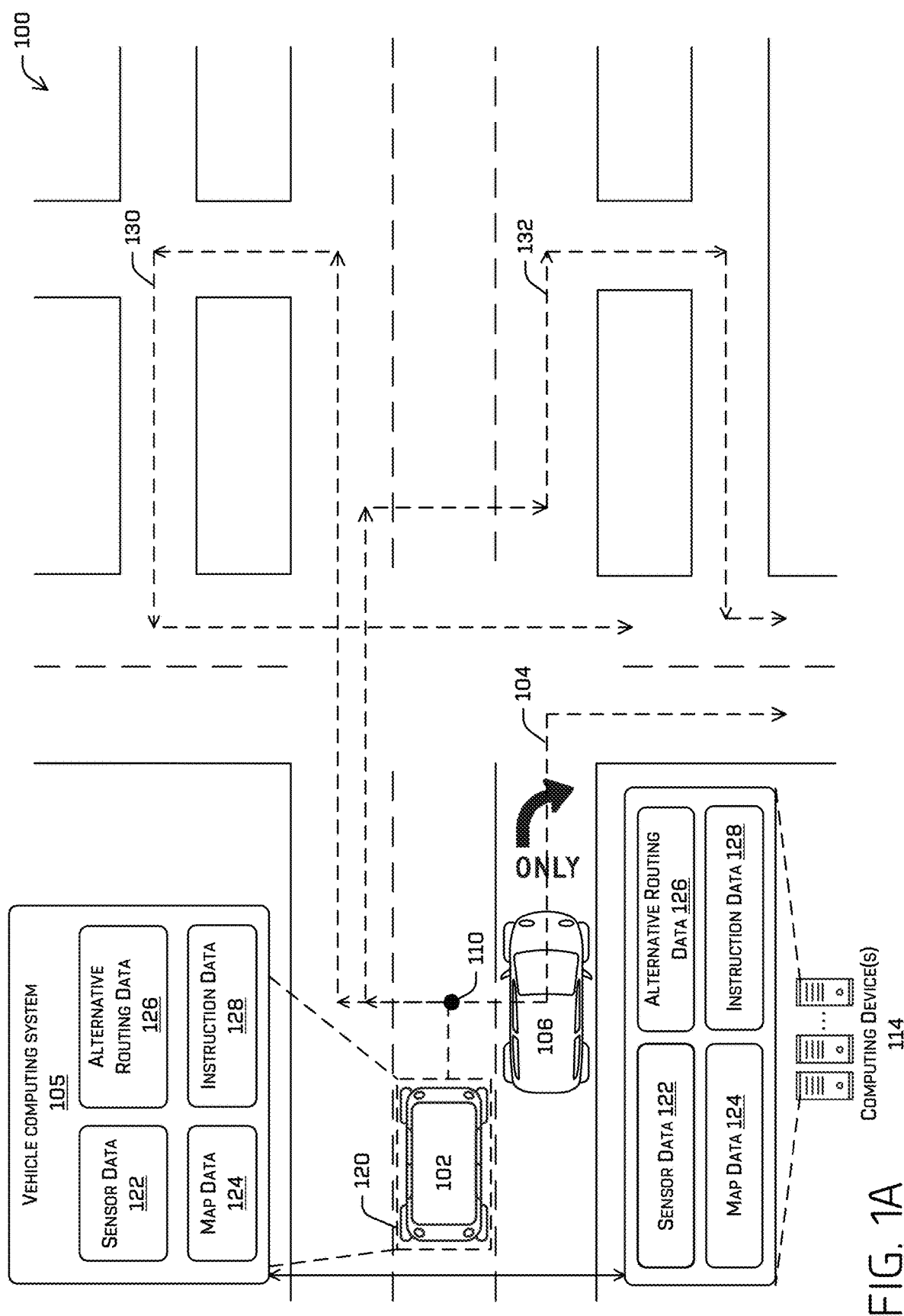
FIG. 1A is an example environment that includes an autonomous vehicle configured to detect a blocked portion in the environment that impedes progress of the autonomous vehicle and transmit a re-routing request to one or more remote computing devices, in accordance with examples of this disclosure.

An autonomous vehicle may navigate along a planned path or between waypoints, such as by navigating from a pickup location to a destination location. However, in some circumstances, the planned path of the autonomous vehicle may be impeded by a portion in an environment of the autonomous vehicle. For example, a portion in an environment may be blocked by a dynamic object (e.g., a car, truck, motorcycle, bicycle, etc.) or be blocked by a static object (e.g., one or more traffic cone or barriers, fencing, a double-parked vehicle, etc.). For example, a vehicle computing system may determine that a portion of the environment is blocked by another vehicle, such as a car operating in a lane proximate to the autonomous vehicle and impeding a lane change associated with the planned path. For another example, the vehicle computing system may determine that the planned path of the autonomous vehicle is impeded by a fence erected around a construction zone. Based on determining the planned path is impeded, the vehicle computing system may generate one or more alternative paths to navigate the autonomous vehicle around the blocked portion to a destination location. The vehicle computing system may further transmit a re-routing request and alternative routing data representing the alternative paths to a remote computing device. In some instances, the vehicle computing system may identify a critical point based on the blocked portion of the environment, and determine to stop the autonomous vehicle at least the threshold distance from the critical point prior to receiving an instruction from the remote computing device. The vehicle computing system may further control the autonomous vehicle to navigate around the blocked portion to the destination location based on the instruction received from the remote computing device.

As such, this application describes techniques for transmitting a re-routing request and alternative routing data to a remote computing device based on detection of a blocked portion in an environment of an autonomous vehicle that impedes a planned path of the autonomous vehicle.

In some examples, the vehicle computing system may identify a blocking object in an environment and determine a semantic classification associated with the blocked portion of the environment based on the blocking object. For example, the blocked portion of the environment may include a construction sign and the vehicle computing system may associate a construction zone class with the blocked portion of the environment. The vehicle computing system may further determine that the semantic classification includes one of a subset of classes. Example classes may include pedestrian, bicycle, vehicle, construction sign, construction equipment, and construction zone, etc. Based on determining that the semantic classification includes one of the subset of classes, the vehicle computing system may generate one or more alternative paths and transmit a re-routing request and alternative routing data representing the alternative paths to one or more remote computing devices. Furthermore, in some examples, the one or more alternative paths may be generated by the one or more remote computing devices and be provided to a teleoperator for confirmation.

In some examples, the vehicle computing system may determine a planned path of the autonomous vehicle includes a lane change and the autonomous vehicle is unable to perform the lane change. For example, when the autonomous vehicle is navigating in a first lane and the planned path of the autonomous vehicle includes a lane change into a second lane that is occupied by another vehicle, the planned path of the autonomous vehicle may be impeded by the other vehicle. In some examples, responsive to determining that the lane change failure has occurred (e.g., the vehicle is unable to perform the lane change), the vehicle computing system may cause the autonomous vehicle to stop forward movement. In some examples, the vehicle computing system may cause the autonomous vehicle to stop forward movement at a designated location. The designated location can include a location determined by the vehicle computing system, such as a location prior to (e.g., a threshold distance from) a junction associated with the planned path of the autonomous vehicle, or the like. Such a designated location may be based on, for example, optimizing visibility for sensors associated with the vehicle, constraints of the vehicle such as maneuverability and/or additional obstacles, hazardous situations (blocking driveways, paths for egress, etc.), and the like. In some examples, the vehicle computing system may determine, based on the autonomous vehicle remaining stopped at the location for a threshold period of time (e.g., 0.1 seconds, 0.5 seconds, 1 second, two seconds, etc.), that the autonomous vehicle is unable to perform the lane change and/or that an alternative path may be required. As another example, the vehicle computing system may determine, based on an overlap between a blocked portion of an environment and the planned path, that the autonomous vehicle is unable to perform the lane change. As such, the autonomous vehicle may generate one or more alternative paths and transmit a re-routing request and alternative routing data representing the one or more alternative paths to the remote computing devices.

In some examples, the remote computing devices may be associated with a remote operator. The remote computing devices may receive the re-routing request and/or the alternative routing data representing the alternative paths from the vehicle computing system and, in response, display a user interface that includes the alternative paths (e.g., image(s), video, etc.) represented by the alternative routing data. For example, the user interface may present one or more lines representing the alternative paths, text describing the alternative paths, consecutive dots representing the alternative paths, and/or other graphical elements that may indicate information about the alternative paths. Additionally, the remote computing devices may receive sensor data from the vehicle computing system and display graphical elements indicating which blocked portions in an environment are causing the planned path of the autonomous vehicle to be impeded. For example, the user interface may display a graphical element that indicates that a blocked portion where the autonomous vehicle is yielding to another vehicle. The graphical element may include, but is not limited to, a blockage sign, shading the blocked portion in the environment, text describing the blocked portion, and/or any other graphical elements that may indicate information about the blocked portion. The remote operator may then use the remote computing devices to send an instruction to the vehicle computing system, where the instruction indicates how the autonomous vehicle is to proceed to navigate the autonomous vehicle around the blocked portion. For example, the vehicle computing system may receive, from the remote computing devices, an indication of selection of an alternative path of the alternative paths. As another example, the vehicle computing system may receive, from the remote computing devices, a re-route path that is generated by the remote operator and is different from the alternative paths. As a further example, the teleoperator may provide guidance to wait for an additional period of time (e.g., a fixed amount of time and/or an amount of time determined by the teleoperator, remote system, or otherwise) and/or an indication of an alternative route if the blocking event is not cleared within the additional period of time.

In some examples, the remote computing devices can be associated with a central server. In some examples, the remote computing devices may receive the re-routing request and alternative routing data representing the alternative paths from the vehicle computing system. In response to receiving the re-routing request, the remote computing devices may determine respective costs associated with the alternative paths. The respective cost may be determined based on a time, a number of lane changes, a number of turns, known traffic considerations, and/or other data associated with the alternative paths. The remote computing devices may rank the alternative paths based on the cost determination. Based on the cost determination (e.g., a lowest cost alternative path, highest cost alternative path, etc.), the central server may send an instruction to the vehicle computing system, where the instruction indicates the re-route path. In some examples, the remote computing devices may send the alternative paths and the respective costs associated with the alternative paths to the autonomous vehicle, and the autonomous vehicle may rank the alternative paths based on the respective costs.

The techniques discussed herein can improve the safety of an autonomous vehicle and efficiency of a remote computing device by automatically detecting a blocked portion in an environment of the autonomous vehicle that impedes a planned path of the autonomous vehicle and transmitting a re-routing request to one or more remote computing devices. By automatically detecting a portion in the environment is that impedes the planned path of the autonomous vehicle, the techniques described herein enable the autonomous vehicle to stop at least a threshold distance from a critical point determined based on the blocked portion in the environment, which improves vehicle safety. Additionally, the techniques may provide a remote operator associated with the remote computing devices with contextual information of the situation of the autonomous vehicle such that the remote operator may provide guidance to the autonomous vehicle. By automatically transmitting a re-routing request and the alternative paths to the computing devices, the techniques described herein enable the alternative paths to be graphically presented to the remote operator, which improves the efficiency of the remote computing device as the remote operator does not have to go through the steps of determining out the route. Furthermore, by including the remote operator in the alternative path decision making process, the techniques described herein improve safe operation of the autonomous vehicle. These and other improvements to the functioning of the autonomous vehicle are discussed herein.

The techniques described herein can be implemented in a number of ways. Example implementations are provided below with reference to the following figures. Although discussed in the context of a vehicle, the methods, apparatuses, and systems described herein can be applied to a variety of systems (e.g., a sensor system or a robotic platform), and are not limited to autonomous vehicles. In one example, similar techniques may be utilized in driver-controlled vehicles in which such a system may provide an indication of whether it is safe to perform various maneuvers. In another example, the techniques may be utilized in an aviation or nautical context, or in any system using planning techniques.

FIG. 1A is an example environment 100 that includes autonomous vehicle 102 configured to detect a portion 106 in the environment 100 that impedes a planned path 104 of the autonomous vehicle 102 and transmit a re-routing request to one or more remote computing devices 114, in accordance with examples of this disclosure. For example, the autonomous vehicle 102 may operate in a first lane and the planned path 104 of the autonomous vehicle 102 may include a lane change into a second lane that is different from the first lane. While operating, a vehicle computing system 105 of the autonomous vehicle 102 may detect a portion 106 in the environment 100 located in the second lane proximate the autonomous vehicle 102. The vehicle computing system 105 may detect the portion 106 in the environment 100 of the autonomous vehicle 102 based on sensor data 122 received from one or more sensors. In some examples, the sensors may include sensors mounted on the vehicle 102, such as cameras, motion detectors, lidar, radar, etc. In some examples, the sensor(s) may include one or more remote sensors, such as, for example sensors mounted on another vehicle and/or sensors mounted in the environment 100. In some examples, the vehicle computing system 105 may determine that the portion 106 is located in the second lane proximate the autonomous vehicle 102 and that the portion 106 is blocking the planned path 104 (e.g., the planned path 104 is impeded).

In some examples, the vehicle computing system 105 may determine, based on the portion 106 blocking the planned path 104, that the lane change associated with the planned path 104 is not possible. In some examples, responsive to determining that the lane change, or following the planned path, is not possible, the vehicle computing system may cause the autonomous vehicle to stop forward movement. In some examples, the vehicle computing system may cause the autonomous vehicle to stop forward movement at a determined location. The determined location can include a location determined by the vehicle computing system, such as a location prior to (e.g., a threshold distance from) a junction (e.g., intersection) associated with the planned path 104 of the autonomous vehicle, or the like. For example, the vehicle computing system 105 may cause the vehicle 102 to stop forward movement prior to a junction associated with the right turn associated with the illustrated planned path 104. Such determinations may be made, as above, on maneuverability, safety, visibility of sensors (e.g., to minimize occlusions), and the like.

In various examples, the vehicle computing system 105 may determine, based on the autonomous vehicle 102 remaining stationary at or proximate to the designated location for a threshold period of time (e.g., 0.1 seconds, 0.5 seconds, two seconds, etc.), that the autonomous vehicle 102 is unable to perform the lane change. Alternatively, the vehicle computing system 105 may determine, based on an overlap between the blocked portion 106 and the planned path 104, that the autonomous vehicle 102 is unable to perform the lane change from the first lane into the second lane.

In some examples, responsive to a determination that the autonomous vehicle is unable to perform lane change, the vehicle computing system 105 may determine one or more alternative paths to navigate the autonomous vehicle 102 around the blocked portion 106 and continue toward a destination location, such as a first alternative path 130 and/or a second alternative path 132 illustrated in FIG. 1. In various examples, the vehicle computing system 105 may determine the first alternative path 130 and the second alternative path 132 based on sensor data 122 and/or map data 124. In additional or alternative examples, such alternative paths may be determined by one or more of a remote computing system, central server, etc. Though illustrated as two alternative paths, this is not intended to be so limiting and the vehicle computing system 105 may be configured to determine a greater or lesser number of alternative paths. The map data 124 may include data associated with one or more maps of the environment 100. The maps may be any number of data structured modeled in two dimensions, three dimensions, or N-dimensions that are capable of providing information about an environment, such as, but not limited to, topologies (such as intersections), streets, mountain ranges, roads, terrain, and the environment in general. In at least one example, the map data 124 can include portions of road structures that are configured for navigational purposes.

In some examples, the vehicle computing system 105 may transmit a re-routing request and alternative routing data 126 representing the first alternative path 130 and the second alternative path 132 to the remote computing devices 114. In some instances, the autonomous vehicle 102 may further send, to the remote computing devices 114, sensor data 122 (e.g., image data, video data) that indicates the planned path 104 is impeded by the portion 106 in the environment 100. In some examples, the remote computing devices 114 may be associated with a remote operator. In such examples, the remote operator may use the data received from the vehicle computing system 105 to provide instruction data 128 to the autonomous vehicle 102. In some examples, the remote computing devices 114 may be associated with a central server, and the central server may use the data received from the vehicle computing system 105 to provide instruction data 128 to the autonomous vehicle 102. In at least some examples, the central server may provide routing information to a fleet of autonomous vehicles.

In various examples, in response to determining that the portion 106 is that impedes the planned path 104 of the autonomous vehicle 102, the vehicle computing system 105 controls the autonomous vehicle 102 to stop at least a threshold distance (e.g., one meter, five feet, etc.) from a critical point 110 in the environment 100. In some examples, the critical point 110 may include an end of a lane. In some examples, the critical point 110 may include a junction start point. By stopping at least the threshold distance from the critical point 110, the autonomous vehicle 102 can safely exit a lane or other drivable surface to provide additional time to determine an alternate route and/or receive instructions from the remote computing devices 114. In some examples, the vehicle computing system 105 may identify a location for the autonomous vehicle 102 to stop based on the sensor data 122 and/or the map data 124. For example, the vehicle computing system 105 may identify the location for the autonomous vehicle 102 to stop based on identifying a parking stop using the map data 124. As another example, the vehicle computing system 105 may identify the location for the autonomous vehicle 102 to stop based on curbside parking area using the sensor data 122. In some examples, the vehicle computing system 105 may be configured to control the autonomous vehicle 102 to the location to await the instruction data 128 from the remote computing devices 114.

Figure 1B:
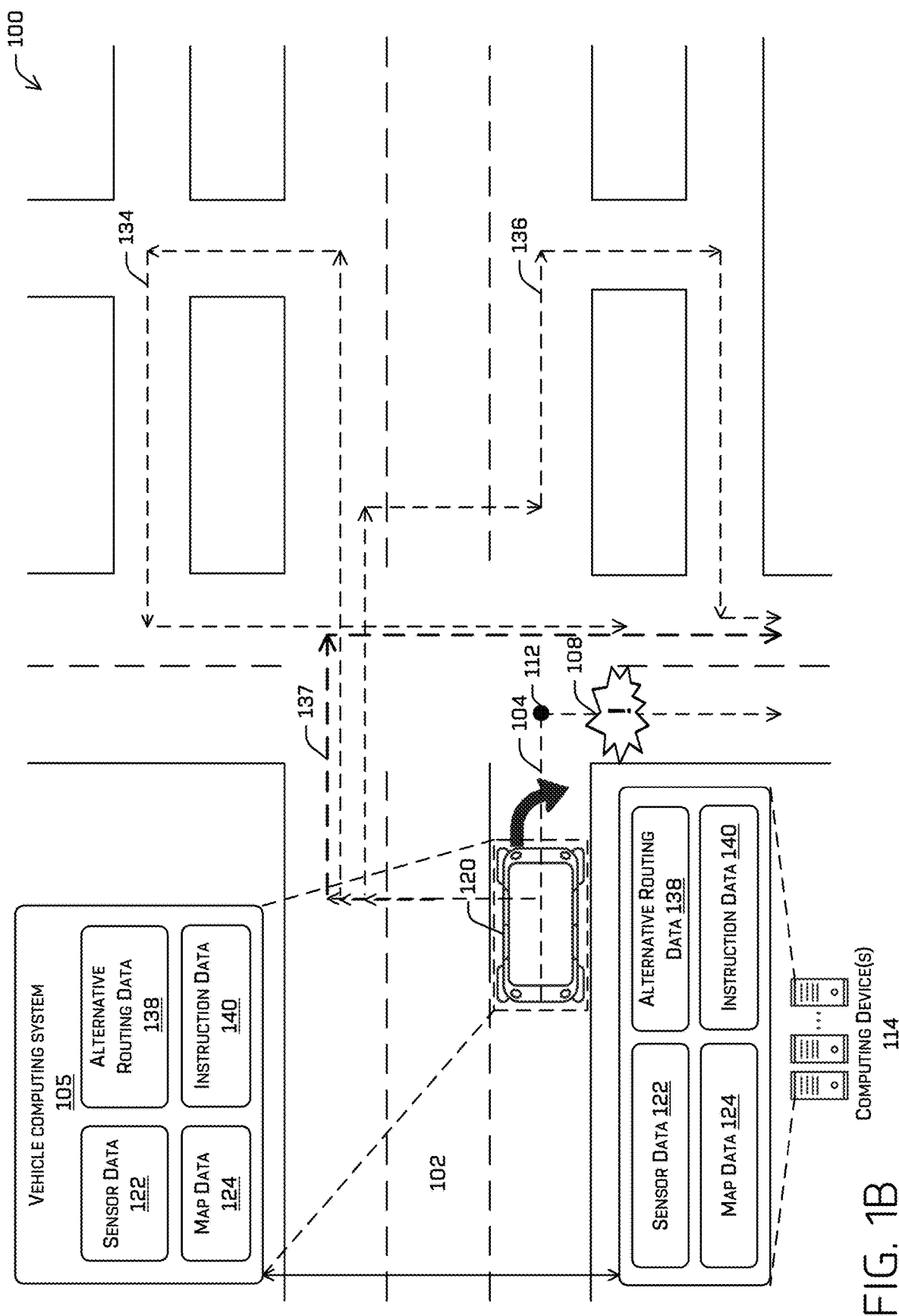
FIG. 1B is an example environment that includes a vehicle configured to detect another blocked portion in the environment that impedes progress of the vehicle and transmit a re-routing request to one or more remote computing devices, in accordance with examples of this disclosure.

FIG. 1B is the example environment 100 that includes the autonomous vehicle 102 configured to detect a portion 108 in the environment 100 that impedes a planned path 104. For example, the portion 108 may be blocked by a static object, such as a traffic cone, a hazard road sign, fencing, a double-parked vehicle, or the like. In response to detecting the portion 108, the vehicle computing system 105 may request navigational assistance from the remote computing devices 114, in accordance with examples of this disclosure. For example, the autonomous vehicle 102 operating in a first lane may detect the portion 108 includes an unmoving object based on the sensor data 122 and determine that the portion 108 impedes the planned path 104. As illustrated in FIG. 1B, the planned path 104 of the autonomous vehicle 102 may include a junction linking a first lane and a second lane. When the autonomous vehicle 102 approaches close to the junction, the autonomous vehicle 102 may detect the portion 108 located in the second lane that prevents the autonomous vehicle 102 to travel through the junction (e.g., the autonomous vehicle 102 is unable to turn right).

In some examples, based on a determination that the planned path 104 is impeded (e.g., blocked), the vehicle computing system 105 may determine a semantic classification associated with the blocked portion 108 in the environment 100 based at least in part on the sensor data 122. For example, the blocked portion 108 may include a blocking object, such as a construction sign, and the vehicle computing system 105 may associate a construction sign class with the blocked portion 108. The vehicle computing system 105 may further determine the semantic classification associated with the blocked portion 108 include one of a subset of classes. The classes may include a double-parked vehicle, a broken-down vehicle, a traffic cone, a hazard road sign, an emergency event sign, a construction sign, a piece of equipment (e.g., a tractor, a streetcleaner), and/or the like. For instance, the semantic classification associated with the portion 108 may include a construction sign class that indicates current road work along the planned path 104.

Based on determining that the semantic classification includes one of the subset of classes, the vehicle computing system 105 may determine a third alternative path 134 and a fourth alternative path 136 for the autonomous vehicle 102 to navigate around the portion 108. Though illustrated as two alternative paths, this is not intended to be so limiting and the vehicle computing system 105 may be configured to determine a greater or lesser number of alternative paths. As discussed above with regard to the first alternative path 130 and the second alternative path 132, the vehicle computing system 105 may determine the third alternative path 134 and the fourth alternative path 136 based on the sensor data 122 and/or the map data 124.

In various examples, the vehicle computing system 105 may transmit a re-routing request including alternative routing data 138 representing the third alternative path 134 and the fourth alternative path 136 to the remote computing devices 114. The remote computing devices 114 may receive the alternative routing data 138 from the vehicle computing system 105 and, in response, display a user interface that includes the alternative paths 134 and 136 represented by the alternative routing data 138. For example, the user interface may present one or more lines representing the alternative paths 134 and 136, text describing the alternative paths 134 and 136, consecutive dots representing the alternative paths 134 and 136, and/or other graphical elements that may indicate information about the alternative paths 134 and 136. Additionally, the computing devices 114 may display graphical elements indicating which portions of the environment 100 are causing the planned path 104 of the autonomous vehicle 102 to be impeded. For example, the user interface may display a graphical element that indicates that that the planned path 104 of the autonomous vehicle 102 is impeded by the portion 108. As described herein, a graphical element may include, but is not limited to, a blockage sign, shading the blocked portion 108, text describing the blocked portion 108, and/or any other graphical elements that may indicate information about the blocked portion 108. It should be understood that the techniques described above can also be performed by other devices, such as by the vehicle computing system 105, a remote machine, a central server, etc.

In some examples, the remote computing devices 114 may be associated with a remote operator and the remote operator may use the remote computing devices 114 to send instruction data 140 to the vehicle computing system 105, where the instruction data 140 indicates how the autonomous vehicle 102 is to proceed. In some examples, the instruction data 140 may include an indication of selection of an alternative path of the alternative paths 134 and 136. In some examples, the instruction data 140 may include a re-route path 137 that is generated by the remote operator and is different from the alternative paths 134 and 136. For example, the remote operator may generate the re-route path 137 via an input device to provide guidance to the vehicle computing system 105. The input device may include one or more of a touch-sensitive screen, a stylus, a mouse, a dial, a keypad, a microphone, a touchscreen, and/or a gesture-input system configured to translate gestures performed by the remote operator into input commands for the remote computing devices 114. Examples of providing remote guidance data via an input device are discussed in, for example, U.S. patent application Ser. No. 16/457,646 titled "Remote Vehicle Guidance," filed Jun. 28, 2018, which is incorporated by reference herein in its entirety for all purposes, and in, for example, U.S. patent application Ser. No. 16/457,289 titled "Techniques for Contacting a Teleoperator," filed Jul. 18, 2019, which is incorporated by reference herein in its entirety for all purposes.

In some examples, the remote computing devices 114 may be associated with a central server and the central server may use the data received from the vehicle computing system 105 to provide instruction data 140 to the autonomous vehicle 102. For example, the central server may determine a re-route path based on respective time costs associated with the alternative paths 134 and 136. As another example, the central server may determine a re-route path based on respective number of lane changes associated with the alternative paths 134 and 136. In some examples, the central server may further leverage artificial intelligence, machine learning, and/or other decision-making strategies to determine a re-route path from the alternative paths 134 and 136.

Figure 2:
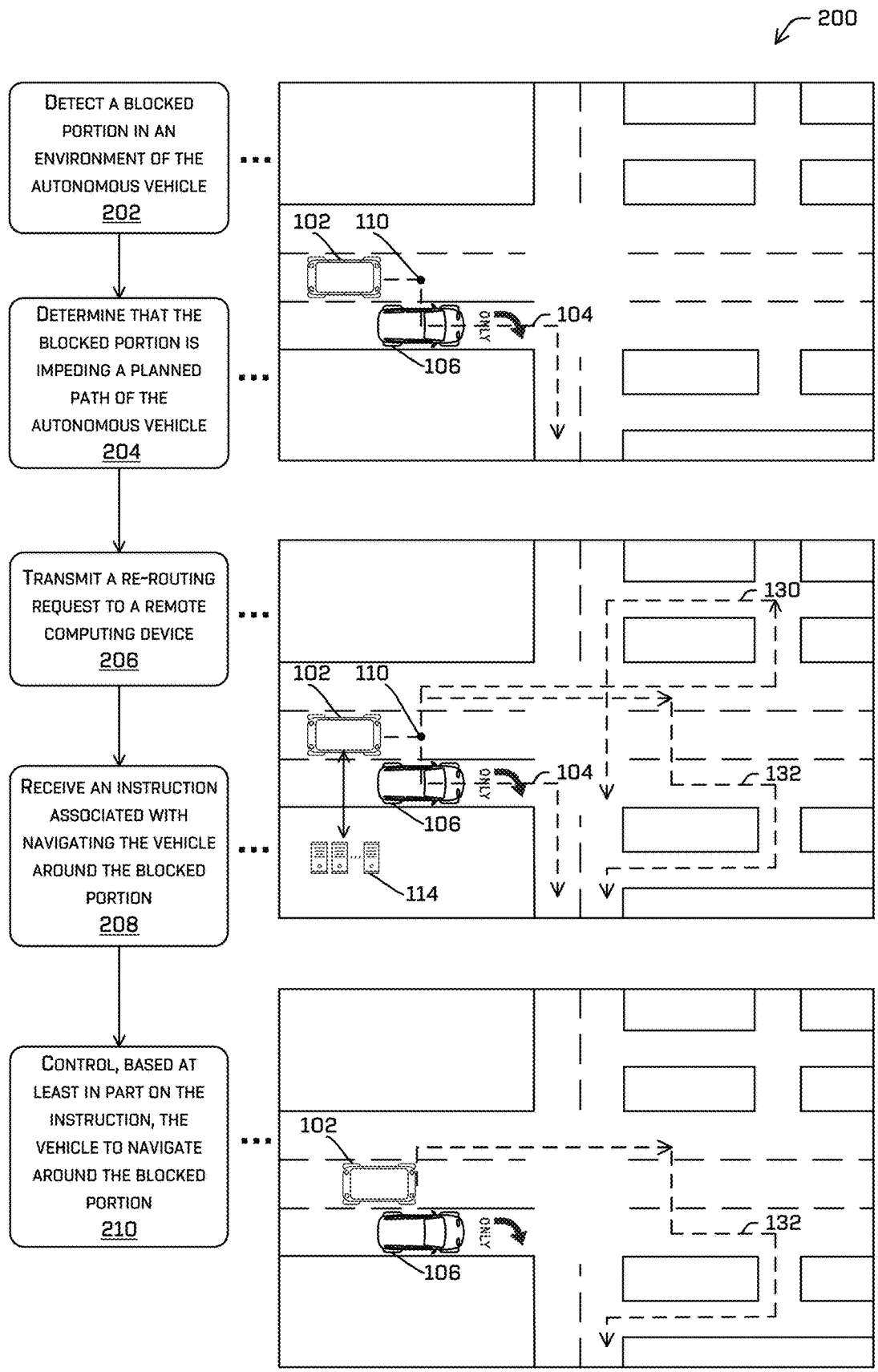
FIG. 2 is a pictorial flow diagram of an example process for transmitting a re-routing request to a remote computing device and controlling a vehicle based on instructions received from the remote computing device, in accordance with examples of this disclosure.

FIG. 2 is a pictorial flow diagram of an example process 200 for transmitting a re-routing request and alternative routing data 126 representing the alternative paths 130 and 132 to the remote computing devices 114, and receiving instructions from the remote computing devices 114, in accordance with examples of this disclosure.

An operation 202 can include detecting, based at least in part on sensor data 122 associated with the autonomous vehicle 102, a portion of the environment that impedes travel along a current route (e.g., as illustrated, the portion 106 in the environment 100 of the autonomous vehicle 102).

An operation 204 can include determining that the portion 106 in the environment 100 that impedes the planned path 104 of the autonomous vehicle 102.

In some examples, the process 200 may further include determining that the autonomous vehicle 102 is operating in a first lane; determining that the planned path 104 of the autonomous vehicle 102 includes a lane change into a second lane that is different from the first lane; determining that the portion 106 is located in the second lane proximate the autonomous vehicle 102; and determining, based on an overlap between the portion 106 and the planned path 104, that the autonomous vehicle 102 is unable to perform the lane change.

In some examples, the process 200 may include determining a semantic classification associated with the portion 106, based at least in part on the sensor data 122 associated with autonomous vehicle 102. The process 200 may further include determining the semantic classification include one of a subset of classes and determining, based at least in part on the semantic classification includes one of the subset of classes, that the autonomous vehicle 102 is unable to perform the lane change.

In some examples, the process 200 may further include determining, based at least in part on determining that the autonomous vehicle 102 is unable to perform the lane change, the alternative paths 130 and 132 to navigate the autonomous vehicle 102 around the portion 106. It should be understood that the process 200 described herein can also be performed by other devices, such as by a remote machine, a central server, etc.

An operation 206 can include transmitting, to the remote computing devices 114, a re-routing request. In some examples, the re-routing request may include the alternative routing data 126 representing the alternative paths 130 and 132. In some examples, the process 200 may further include determining a critical point based on the blocked portion 106 and stopping the autonomous vehicle 102 at least a threshold distance from the critical point.

An operation 208 can include receiving, from the remote computing devices 114, an instruction associated with navigating the autonomous vehicle 102 around the portion 106.

In some examples, the remote computing devices 114 are associated with a remote operator, and the instruction associated with navigating the autonomous vehicle around the portion 106 includes at least one of an indication of determination of an alternative path of the alternative paths 130 and 132; a re-route path that is generated by the remote operator and is different from the alternative paths 130 and 132; or an instruction to wait an additional period of time (e.g., up to some maximum amount of time).

In some examples, the remote computing devices 114 are associated with a central server, and the instruction associated with navigating the autonomous vehicle around the portion 106 includes at least one of a re-route path determined based on respective time costs associated with the alternative paths 130 and 132; a re-route path determined based on respective number of lane changes associated with the alternative path 130 and 132; or a re-route path determined based on respective number of turns associated with the alternative paths 130 and 132.

An operation 210 can include controlling, based at least in part on the instruction, the autonomous vehicle 102 to navigate around the portion 106. As shown in FIG. 2, the vehicle computing system 105 of the autonomous vehicle 102 may receive, from the remote computing devices 114, an instruction associated with navigating the autonomous vehicle 102 around the portion 106, such as navigating the autonomous vehicle 102 along the alternative path 132. The vehicle computing system 105 of the autonomous vehicle 102 may further control, based at least in part on the instruction, the autonomous vehicle 102 to navigate around the portion 106.

Figure 3:
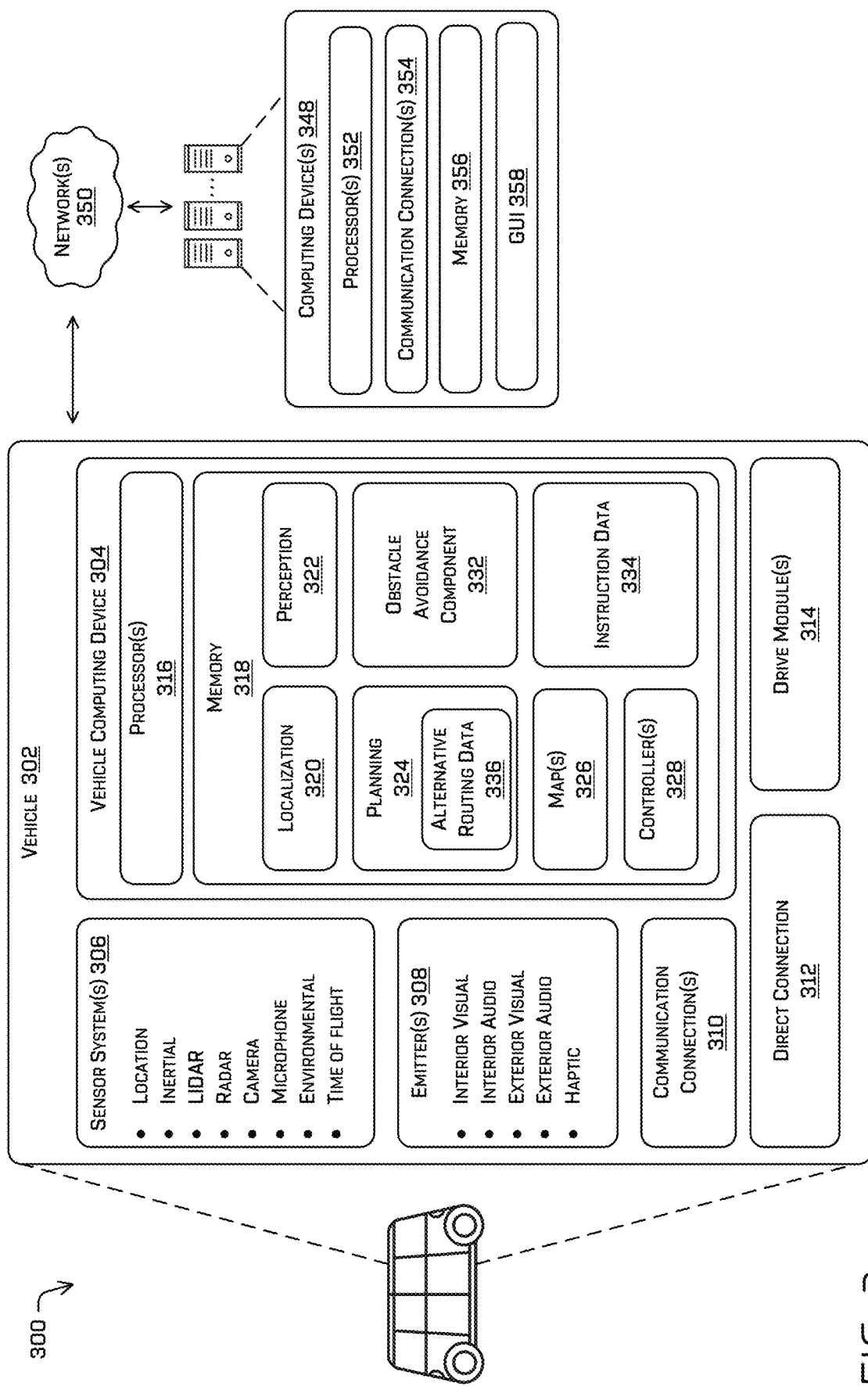
FIG. 3 depicts a block diagram of an example system for implementing the techniques described herein, in accordance with examples of this disclosure.

FIG. 3 depicts a block diagram of an example system 300 for implementing the techniques described herein, in accordance with examples of this disclosure. In at least one example, the system 300 can include a vehicle 302 (which may represent, and/or be similar to, the autonomous vehicle 102). The vehicle 302 can include a vehicle computing device 304 (e.g., the vehicle computing system 105 described above), one or more sensor systems 306, one or more emitters 308, one or more communication connections 310, at least one direct connection 312, and one or more drive modules 314.

The vehicle computing device 304 can include one or more processors 316 and a memory 318 communicatively coupled with the one or more processors 316. In the illustrated example, the vehicle 302 is an autonomous vehicle. However, the vehicle 302 may be any other type of vehicle (e.g., a manually driven vehicle, a semi-autonomous vehicle, etc.), or any other system having at least an image capture device. In the illustrated example, the memory 318 of the vehicle computing device 304 stores a localization component 320, a perception component 322, a planning component 324, one or more system controllers 326, one or more maps 328, sensor data 330, and instruction data 332. Though depicted in FIG. 3 as residing in the memory 318 for illustrative purposes, it is contemplated that the localization component 320, the perception component 322, the planning component 324, the one or more system controllers 326, the one or more maps 328, sensor data 330, and/or the instruction data 332 can additionally, or alternatively, be accessible to the vehicle 302 (e.g., stored on, or otherwise accessible by, memory remote from the vehicle 302).

In at least one example, the localization component 320 can include functionality to receive sensor data 330 (which may represent, and/or be similar to, the sensor data 122) from the sensor system(s) 306 and to determine a position and/or orientation of the vehicle 302 (e.g., one or more of an x-, y-, z-position, roll, pitch, or yaw). For example, the localization component 320 can include and/or request/receive a map of an environment and can continuously determine a location and/or orientation of the vehicle 302 within the map. In some instances, the localization component 320 can utilize SLAM (simultaneous localization and mapping), CLAMS (calibration, localization, and mapping, simultaneously), relative SLAM, bundle adjustment, non-linear least squares optimization, or the like to receive image data, lidar data, radar data, IMU data, GPS data, wheel encoder data, and the like to accurately determine the location of the vehicle 302. In some instances, the localization component 320 can provide data to various components of the vehicle 302 to determine an initial position of the vehicle 302 for generating a candidate trajectory, as discussed herein.

In some instances, the perception component 322 can include functionality to perform object detection, segmentation, and/or classification. In some instances, the perception component 322 can provide processed sensor data 336 that indicates a presence of an object that is proximate to the vehicle 302 and/or a classification of the object as an object type (e.g., car, pedestrian, cyclist, animal, building, tree, road surface, curb, sidewalk, unknown, etc.). In additional and/or alternative examples, the perception component 322 can provide processed sensor data 330 that indicates one or more characteristics associated with a detected object and/or the environment in which the object is positioned. In some instances, characteristics associated with an object can include, but are not limited to, an x-position (global position), a y-position (global position), a z-position (global position), an orientation (e.g., a roll, pitch, yaw), an object type (e.g., a classification), a velocity of the object, an acceleration of the object, an extent of the object (size), etc. Characteristics associated with the environment can include, but are not limited to, a presence of another object in the environment, a state of another object in the environment, a time of day, a day of a week, a season, a weather condition, an indication of darkness/light, etc.

In some examples, the perception component 322 may include a prediction component to generate predicted trajectories of objects (e.g., objects) in an environment. For example, a prediction component may generate one or more predicted trajectories for dynamic objects detected in an environment. In some examples, the predicted trajectories may include any number of potential paths in which a detected object may travel from a current position (e.g., at the time of perception) and/or based on a direction of travel. In some examples, the predicted trajectories may represent a distance and direction in which the object will travel over a period of time. In some examples, a prediction component may measure a trace of an object and generate a trajectory for the object based on observed and predicted behavior. In various examples, the prediction component may determine predicted trajectories based on one or more of machine learning techniques, heat maps, temporal logic, and/or tree search methods.

In general, the planning component 324 may determine a path, such as planned route 104 (e.g., planned path), for the vehicle 302 to follow to traverse through an environment. For example, the planning component 322 may determine various routes and trajectories and various levels of detail. For example, the planning component 322 may determine a route to travel from a first location (e.g., a current location) to a second location (e.g., a target location). In some examples, the planning component 322 may generate an instruction for guiding the autonomous vehicle 302 along at least a portion of the route from a first location to a second location.

In some examples, the planning component 324 can generate one or more alternative paths to navigate the vehicle 302 around a blocked portion and traverse through an environment to reach a destination location. For example, the planning component 324 can determine the alternative paths and store alternative routing data 336 representing the alternative paths in memory 318. For example, the planning component 324 can determine one or more alternative paths to travel from a first location (e.g., a current location) to a second location (e.g., a destination location).

In at least one example, the planning component 324 can identify a critical point based on the blocked portion of an environment and stop the vehicle 302 to stop at least a threshold distance from the critical point. In some examples, the planning component 324 may identify a specific location (e.g., a curbside parking area, a portion of a ground surface, a loading zone, etc.) located at least the threshold distance away from the critical point where the vehicle 302 can stop at the location prior to receiving instructions from one or more remote computing devices 348.

In various examples, the planning component 324 may be configured to receive data associated with waypoints and/or orientations for the vehicle 302 operating in a remote guidance mode from one or more remote computing devices 348. In some examples, the planning component 324 may be configured to validate the waypoints and/or orientations. In at least one example, the planning component 322 may determine how to guide the autonomous vehicle 302 from a first waypoint received from the remote computing device(s) 348 to a second waypoint received from the remote computing device(s) 348. In some examples, the instruction may be a trajectory or a portion of a trajectory. In some examples, multiple trajectories may be substantially simultaneously generated (e.g., within technical tolerances) in accordance with a receding horizon technique, wherein one of the multiple trajectories is selected for the vehicle 302 to navigate.

In some instances, the planning component 324 includes functionality to use instruction data 332 sent by the remote computing devices 348 in order to determine how to navigate the vehicle 302 around the blocked portion. For a first example, the instruction data 332 may represent an instruction to navigate along one of the alternative paths. Based at least in part on the instruction data 334, the planning component 324 may cause the vehicle 302 to navigate along one of the alternative paths to reach a destination location. For a second example, the instruction data 334 may represent an instruction to navigate along a re-route path that is generated by a remote operator and is different from the alternative paths. For example, the remote operator may generate the re-rout path via an input device 360 to provide instruction data to the remote computing devices 348. Based at least in part on the instruction data 334 received from the remote computing devices 348, the planning component 324 may cause the vehicle 302 to navigate around the blocked portion.

In at least one example, the vehicle computing device 304 can include one or more system controllers 326, which can be configured to control steering, propulsion, braking, safety, emitters, communication, and other systems of the vehicle 302. These system controller(s) 326 can communicate with and/or control corresponding systems of the drive module(s) 314 and/or other components of the vehicle 302.

The memory 318 can further include one or more maps 328 that can be used by the vehicle 302 to generate the alternative paths to navigate the vehicle 302 around the blocked portion and traverse through an environment to reach a destination location. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment and can be loaded into working memory as needed. In at least one example, the one or more maps 328 can include at least one map (e.g., images and/or a mesh). In some examples, the vehicle 302 can be controlled based at least in part on the map(s) 328. That is, the map(s) 328 can be used in connection with the localization component 320, the perception component 322, and/or the planning component 324 to determine a location of the vehicle 302, identify the blocked portion in an environment, and/or generate the alternative paths to navigate the vehicle 302 around the blocked portion and traverse through an environment to reach a destination location.

In some examples, the one or more maps 328 may be stored on the remote computing devices 348. In some examples, multiple maps 328 may be stored based on, for example, a characteristic (e.g., type of entity, time of the day, day of the week, season of the year, etc.). Storing multiple maps 328 may have similar memory requirements but increase the speed at which data in a map may be accessed.

In some instances, aspects of some or all of the components discussed herein can include any models, algorithms, and/or machine learning algorithms. For example, in some instances, the components in the memory 318 can be implemented as a neural network. As described herein, an exemplary neural network is a biologically inspired algorithm that passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based at least in part on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 2 (ID2), Chi-squared automatic interaction detection (CHAD), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet70, ResNet101, VGG, DenseNet, PointNet, and the like.

As discussed above, in at least one example, the sensor system(s) 306 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 306 can include multiple instances of each of these or other types of sensors. For instance, the lidar sensors can include individual lidar sensors located at the corners, front, back, sides, and/or top of the vehicle 302. As another example, the camera sensors can include multiple cameras disposed at various locations about the exterior and/or interior of the vehicle 302. The sensor system(s) 306 can provide input to the vehicle computing device 304. Additionally or alternatively, the sensor system(s) 306 can send the sensor data 330, via the one or more network(s) 450, to a control system 448 at a particular frequency, after a lapse of a predetermined period of time, upon the occurrence of one or more conditions, in near real-time, etc.

The vehicle 302 can also include one or more emitters 308 for emitting light and/or sound, as described above. The emitter(s) 308 in this example include interior audio and visual emitters to communicate with passengers of the vehicle 302. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 308 in this example also include exterior emitters. By way of example and not limitation, the exterior emitters in this example include lights to signal a direction of travel or other indicators of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 302 can also include one or more communication connection(s) 310 that enable communication between the vehicle 302 and one or more other local or remote computing device(s). For instance, the communication connection(s) 310 can facilitate communication with other local computing device(s) on the vehicle 302 and/or the drive module(s) 314. Also, the communication connection(s) 310 can allow the vehicle 302 to communicate with other nearby computing device(s) (e.g., other nearby vehicles, traffic signals, etc.). The communications connection(s) 310 also enable the vehicle 302 to communicate with the remote teleoperations computing devices (e.g., the teleoperator system 114) or other remote services.

The communications connection(s) 310 can include physical and/or logical interfaces for connecting the vehicle computing device 304 to another computing device or a network, such as network(s) 350. For example, the communications connection(s) 310 can enable Wi-Fi-based communication such as via frequencies defined by the IEEE 802.11 standards, short range wireless frequencies such as Bluetooth®, cellular communication (e.g., 2G, 2G, 4G, 4G LTE, 5G, etc.) or any suitable wired or wireless communications protocol that enables the respective computing device to interface with the other computing device(s).

In at least one example, the vehicle 302 can include one or more drive modules 314. In some instances, the vehicle 302 can have a single drive module 314. In at least one example, if the vehicle 302 has multiple drive modules 314, individual drive modules 314 can be positioned on opposite ends of the vehicle 302 (e.g., the front and the rear, etc.). In at least one example, the drive module(s) 314 can include one or more sensor systems to detect conditions of the drive module(s) 314 and/or the surroundings of the vehicle 302. By way of example and not limitation, the sensor system(s) 306 can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect entities in the surroundings of the drive module, lidar sensors, radar sensors, etc. Some sensors, such as the wheel encoders can be unique to the drive module(s) 314. In some cases, the sensor system(s) 306 on the drive module(s)

314 can overlap or supplement corresponding systems of the vehicle 302 (e.g., sensor system(s) 306).

The drive module(s) 314 can include many of the vehicle systems, including a high voltage battery, a motor to propel the vehicle 302, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 314 can include a drive module controller which can receive and preprocess the sensor data 330 from the sensor system(s) 306 and control operation of the various vehicle systems. In some instances, the drive module controller can include one or more processors and a memory communicatively coupled with the one or more processors. The memory can store one or more modules to perform various functionalities of the drive module(s) 314. Furthermore, the drive module(s) 314 also include one or more communication connection(s) that enable communication by the respective drive module with one or more other local or remote computing device(s).

In at least one example, the direct connection 312 can provide a physical interface to couple the one or more drive module(s) 314 with the body of the vehicle 302. For example, the direct connection 312 can allow the transfer of energy, fluids, air, data, etc. between the drive module(s) 314 and the vehicle 302. In some instances, the direct connection 312 can further releasably secure the drive module(s) 314 to the body of the vehicle 302.

As further illustrated in FIG. 3, the remote computing devices 348 can include processor(s) 352, communication connection(s) 354, memory 356, graphical user interface (GUI) 358, and input device 360. The processor(s) 316 of the vehicle 302 and/or the processor(s) 352 of the remote computing devices 348 (and/or other processor(s) described herein) can be any suitable processor capable of executing instructions to process data and perform operations as described herein. By way of example and not limitation, the processor(s) 316 and 352 can comprise one or more Central Processing Units (CPUs), Graphics Processing Units (GPUs), or any other device or portion of a device that processes electronic data to transform that electronic data into other electronic data that can be stored in registers and/or memory. In some instances, integrated circuits (e.g., ASICs, etc.), gate arrays (e.g., FPGAs, etc.), and other hardware devices can also be considered processors in so far as they are configured to implement encoded instructions.

The memory 318 and the memory 356 (and/or other memory described herein) are examples of non-transitory computer-readable media. The memory 318 and the memory 356 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

The GUI 358 may display one or more alternative paths represented by the alternative routing data 336 received from the vehicle 302. For example, the GUI 358 may present one or more lines representing the alternative paths, text describing the alternative paths, consecutive dots representing the alternative paths, and/or other graphical elements that may indicate information about the alternative paths. Additionally, the remote computing devices 348 may receive sensor data 330 from the vehicle 302 and display graphical elements indicating which portion(s) in an environment are causing the planned path of the vehicle to be impeded. For example, the GUI 358 may display a graphical element that indicates that the vehicle 302 is impeded by a portion that is blocked by a piece of construction equipment. The graphical element may include, but is not limited to, a blockage sign, shading a blocked portion, text describing the blocked portion, bounding boxes, and/or any other graphical element that may indicate information about the blocked portion.

The input device 360 may include one or more of a touch-sensitive screen, a stylus, a mouse, a dial, a keypad, a microphone, a touchscreen, and/or a gesture-input system configured to translate gestures performed by the remote operator into input instruction data 334 for the remote computing devices 348. In some examples, the remote operator may provide an indication of the selection of an alternative path of the alternative paths via the input device 360. In some examples, the remote operator may generate a re-route path that is different from the alternative paths using the input device 360.

Figure 4:
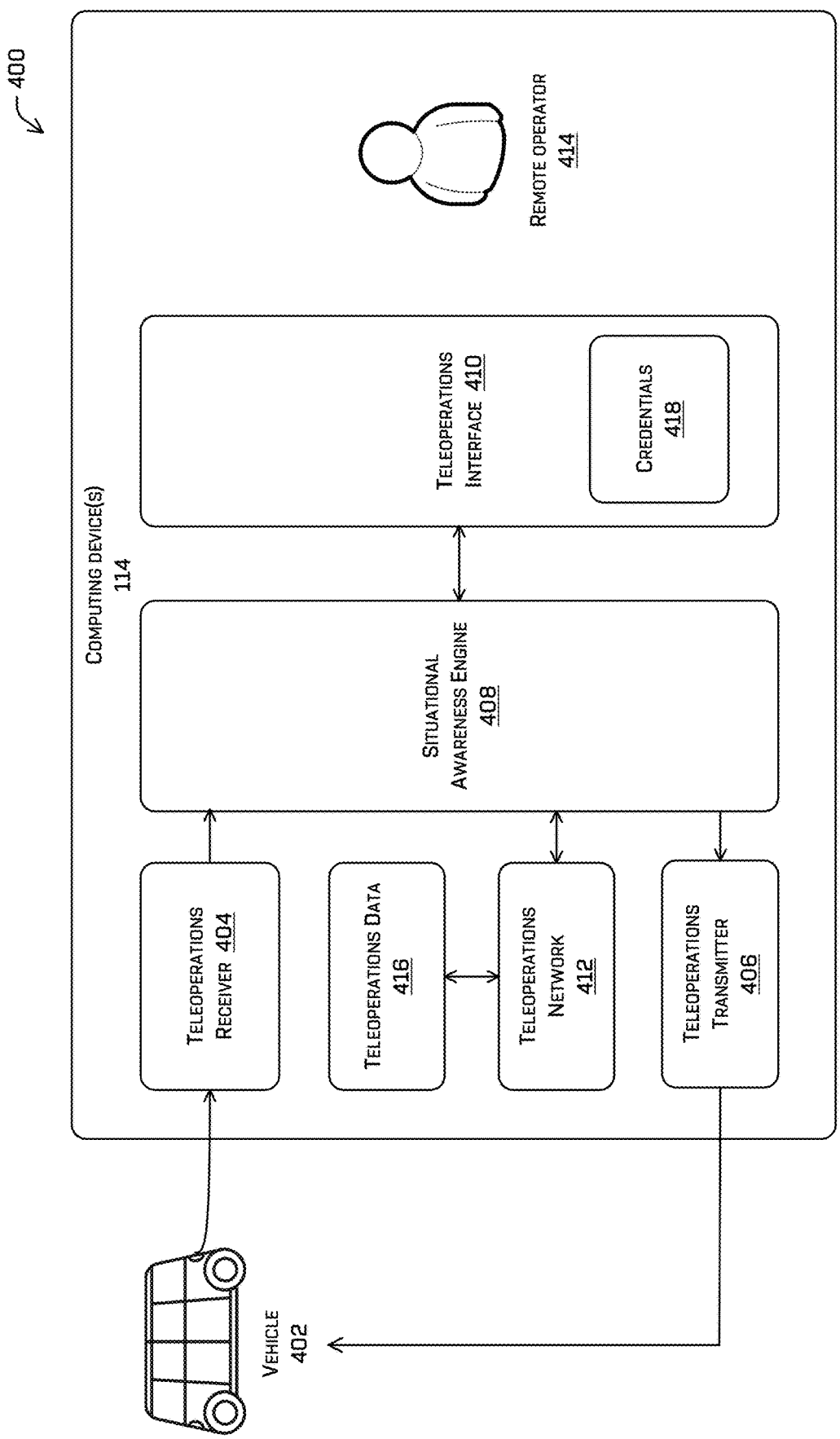
FIG. 4 is a block diagram of an example teleoperations system architecture, in accordance with examples of this disclosure.

FIG. 4 shows an example architecture 400 including a fleet of vehicles 402 and the remote computing devices 114. The example vehicle fleet 402 includes one or more vehicles (e.g., the vehicle 302), at least some of which are communicatively coupled to the remote computing devices 114 via the communication connection(s) of the vehicles. A teleoperations receiver 404 and a teleoperations transmitter 406 associated with the remote computing devices 114 may be communicatively coupled to the respective communication connection(s) of the vehicles 402. For example, the vehicle 402 may send communication signals via the communication connection(s) 410, which are received by the teleoperations receiver 404. In some examples, the communication signals may include, for example, the sensor data 330, the alternative routing data 336, and/or any data and/or output from one or more components of the vehicle 402. In some examples, the sensor data 330 may include raw sensor data and/or processed sensor data, such as video data, image data, etc. In some examples, the communication signals may include the alternative routing data 336 representing alternative paths from the current location of the vehicle 402 to a destination location. In some examples, the communication signals from the vehicle 402 may include a re-routing request to the remote computing devices 114.

As shown in FIG. 4, a situational awareness engine ("SAE") 408 may obtain the communication signals from the vehicle 402 and relay at least a subset of them to a teleoperations interface 410. The SAE 408 may additionally or alternatively obtain signals generated via the teleoperations interface 410 and relay them to a teleoperations network 412 and/or transmit at least a subset of them to one or more vehicles of the vehicle fleet 402 via the teleoperations transmitter 406. The SAE 408 may additionally or alternatively obtain signals from the teleoperations network 412 and relay at least a subset of them to the teleoperations interface 410 and/or the teleoperations transmitter 406. In some examples, the teleoperations interface 410 may directly communicate with the vehicle fleet 402.

In some examples, the SAE 408 can be implemented on a device that is separate from a device that includes the teleoperations interface 410. For example, the SAE 408 can include a gateway device and an application programming interface ("API") or similar interface. In some examples, the SAE 408 includes an application interface and/or a model, such as, for example, a Finite-State Machine (FSM) model, an Artificial Neural Network (ANN) model, and/or a Directed Acyclic Graph (DAG) model. In some examples, the SAE 408 is configured to determine a presentation configuration of data received from one or more elements discussed herein (e.g., the vehicle 402, the vehicle fleet 402, and/or other teleoperations interfaces) and/or input options to present to the teleoperator to provide guidance to one or more vehicles (e.g., an option to select a displayed button that confirms a path determined by the vehicle).

In some examples, the teleoperations receiver 404 may be communicatively coupled to the teleoperations interface 410 via the SAE 408, and in some examples, a remote operator 414 may be able to access the map data 328, the sensor data 330, the alternative routing data 336, and/or any other data in the communication signals received from the vehicle 402 via the teleoperations interface 410. In some examples, the remote operator 414 may be able to selectively access the map data 328, the sensor data 330, the alternative routing data 336, and/or other data via an input device, and view the selected data via one or more displays. In some examples, such selective accessing can include transmitting a request for data from the vehicle 402 via the teleoperations transmitter 406. In some examples, the SAE 408 may present a subset or representation of the data to the remote operator 414 via the teleoperations interface 410. As a non-limiting example, the SAE 408 may create simplistic pictorial representations, bounding boxes, arrows indicating a bearing and velocity of objects, icons representing objects, colorization of the sensor data, or other representations of the data which may simplify interpretation by a remote operator 414.

In the example shown, the remote computing devices 114 also includes the teleoperations network 412 configured to provide communication between two or more of the teleoperations interfaces 410 and the respective teleoperators 414, and/or communication with teleoperations data 416. For example, the remote computing devices 114 may include a plurality of teleoperations interfaces 410 and respective teleoperators 414, and the teleoperators 414 may communicate with one another via the teleoperations network 412 to facilitate and/or coordinate the guidance provided to the vehicle fleet 402. In some examples, there may be a remote operator 414 assigned to each vehicle from the vehicle fleet 402, and in some examples, a remote operator 414 may be assigned to more than a single vehicle of the vehicle fleet 402. In some examples, more than one remote operator 414 may be assigned to a single vehicle. In some examples, teleoperators 414 may not be assigned to specific vehicles of the vehicle fleet 402, but may instead provide guidance to vehicles that have encountered certain types of events and/or to vehicles based at least in part on, for example, a level of urgency associated with the vehicle's encounter with the event. In some examples, data associated with an event and/or the guidance provided by a remote operator 414 may be stored by the remote computing devices 114, for example, in storage for the teleoperations data 416, and/or accessed by other teleoperators 414.

In some examples, the teleoperations data 416 may be accessible by the teleoperators 414, for example, via the teleoperations interface 410, for use in providing guidance to the vehicles 402. For example, the teleoperations data 416 may include global and/or local map data related to the road network, events associated with the road network, and/or travel conditions associated with the road network due to, for example, traffic volume, weather conditions, construction zones, and/or special events. In some examples, the teleoperations data 416 may include data associated with one more of the vehicles of the vehicle fleet 402, such as, for example, maintenance and service information, and/or operational history including, for example, event history associated with the vehicle 402, route histories, occupancy histories, and other types of data associated with the vehicle 402.

In some examples, a remote operator 414 and/or a teleoperations interface 410 can be associated with credentials 418. For example, to activate a session at the teleoperations interface 410, the remote computing devices 114 may require the remote operator 414 to authenticate using the credentials 418. In some examples, the credentials 418 may be inherent to the particular teleoperations interface 410. In some examples, requests for assistance with a particular permutation of operation state data (e.g., certain events) and/or a particular teleoperation option may require resolution by a teleoperations interface 410 having elevated credentials 418 (e.g., credentials with greater permissions). For example, if a remote operator 414 selects an action at a teleoperations interface 410 that would affect the entire vehicle fleet 402 instead of just one vehicle, the action could be transmitted to a second teleoperations interface 410 that has elevated credentials associated therewith for confirmation, modification, and/or rejection. A request and/or operation state data associated with an elevated level of credentials can be used to determine a teleoperations interface 410 to which to relay the request. In some examples, the SAE 408 can relay a request and/or operation state data associated with an elevated level of credentials to multiple teleoperations interfaces 410 instead of a single teleoperations interface 410.

Figure 5:
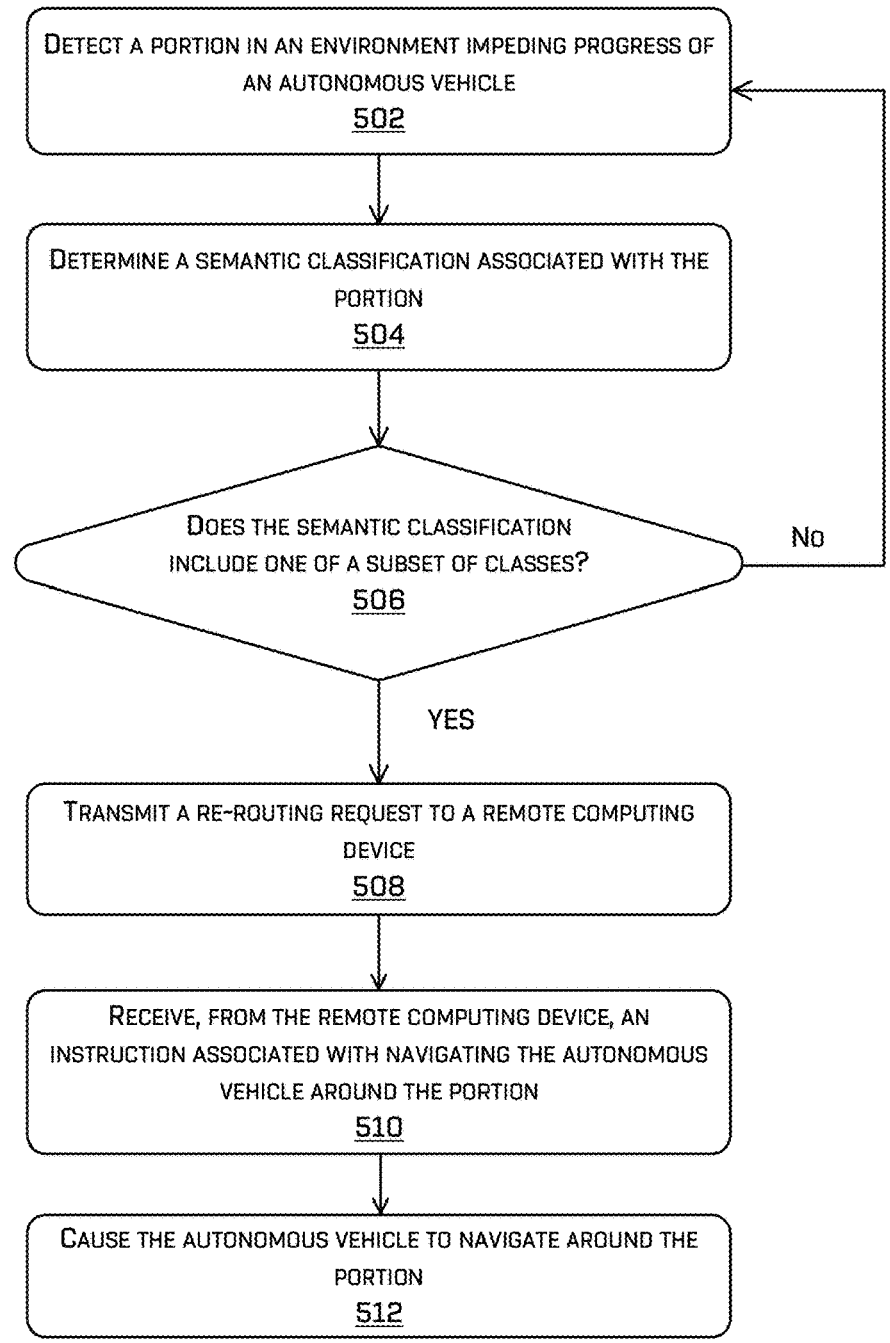
FIG. 5 depicts an example process for navigating a vehicle around a blocked portion in an environment based at least in part on instructions received from a remote computing device, in accordance with examples of this disclosure.

FIG. 5 depicts an example process 500 for transmitting a re-routing request and alternative routing data representing the one or more alternative paths and to one or more remote computing devices and receiving instructions from the one or more remote computing devices, in accordance with examples of this disclosure. Some or all of the process 500 may be performed by one or more components in FIG. 3, as described herein. For example, some or all of the process 500 may be performed by the vehicle computing device(s) 304 (e.g., the vehicle computing system 105).

At operation 502, the process may include detecting, based at least in part on sensor data associated with the autonomous vehicle, a portion in an environment that impedes progress of the autonomous vehicle. In some examples, the sensor data may be captured by one or more sensors mounted on the autonomous vehicle, such as, for example, cameras, motion detectors, lidar, radar, etc. In some examples, the sensor data may be captured by one or more remote sensors, such as, for example sensors mounted on another vehicle and/or sensors mounted in the environment of the autonomous vehicle.

At operation 504, the process may include determining a semantic classification associated with the portion of the environment. In some examples, the process may further include determining that the semantic classification includes one of a subset of classes. The autonomous vehicle may be configured, such as by using a perception component, to identify and/or classify one or more dynamic and/or static objects in an environment in which the vehicle operates. For instance, the vehicle computing system may detect a blocking object in the portion and identify the blocking object as a construction sign that indicates road work along the planned path of the autonomous vehicle. As such, the vehicle computing system may associate, based at least in part on the identification of the construction sign indicating the road work, a construction zone class with the portion of the environment.

Responsive to determining that the semantic classification includes one of a subset of classes ("Yes" at operation 506), the process may determine the planned path is blocked. The process may include, at operation 508, transmitting a re-routing request to a remote computing device.

Responsive to determining that the semantic classification does not include one of a subset of classes ("No" at operation 506), the process may determine the planned path is unblocked and continue to detect a portion in the environment that may impede the progress of the autonomous vehicle.

In some examples, the process may further include determining that the autonomous vehicle is operating in a first lane; determining that the planned path of the autonomous vehicle includes a lane change into a second lane that is different from the first lane; determining that the object is operating in the second lane proximate the autonomous vehicle; and determining, based on the autonomous vehicle remain stationary close to the end of the first lane for a threshold period of time (e.g., two seconds, five seconds, ten seconds, etc.), that the autonomous vehicle is unable to perform the lane change and unable to continue on the planned path.

At operation 510, the process may include receiving, from the remote computing devices, an instruction associated with navigating the autonomous vehicle around the blocked portion.

In some examples, the remote computing devices are associated with a remote operator and the instruction from the remote computing devices may include at least one of an indication of selection of an alternative path of the alternative paths; or a re-route path that is generated by the remote operator and is different from the alternative paths.

In some examples, the remote computing devices are associated with a central server and the instruction from the remote computing devices may include at least one of a re-route path determined based on respective time costs associated with the alternative paths; a re-route path determined based on respective number of lane changes associated with the alternative paths; or a re-route path determined based on respective number of turns associated with the alternative paths.

At operation 512, the process may include controlling, based at least in part on the instruction, the autonomous vehicle to navigate around the blocked portion.

EXAMPLE CLAUSES

A. A system comprising: one or more processors; and one or more non-transitory computer-readable media storing instructions executable by the one or more processors, wherein the instructions, when executed, cause the system to perform operations comprising: detecting, based at least in part on sensor data associated with an autonomous vehicle, a blocked portion in an environment of the autonomous vehicle; determining that the blocked portion impedes a planned path of the autonomous vehicle; determining, based at least in part on determining that the blocked portion impedes the planned path, one or more alternative paths to navigate the autonomous vehicle around the blocked portion; transmitting, to one or more remote computing devices, a re-routing request and alternative routing data representing the one or more alternative paths; receiving, from the one or more remote computing devices, an instruction associated with navigating the autonomous vehicle around the blocked portion; and controlling, based at least in part on the instruction, the autonomous vehicle to navigate around the blocked portion.

B. The system as paragraph A recites, wherein the instructions further comprising: determining a semantic classification associated with the blocked portion of the environment; and determining the semantic classification comprises one of subset of classes, wherein determining the one or more alternative paths is based at least in part on a determination that the semantic classification comprises the one of the subset of classes.

C. The system as paragraph A or B recites, wherein the instructions further comprising: determining that the autonomous vehicle is operating in a first lane; determining that the planned path of the autonomous vehicle includes a lane change into a second lane that is different from the first lane; determining that the blocked portion is located in the second lane proximate the autonomous vehicle; and determining, based on an overlap between the blocked portion and the planned path, that the autonomous vehicle is unable to perform the lane change.

D. The system as any of paragraphs A-C recite, wherein the one or more remote computing devices are associated with a remote operator and the instruction comprises at least one of: an indication of determination of an alternative path of the one or more alternative paths, a re-route path that is generated by the remote operator and is different from the one or more alternative paths, or an indication for the autonomous vehicle to continue to wait an additional period of time.

E. The system as any of paragraphs A-D recite, wherein the one or more one or more alternative paths are determined based at least in part on one or more of: a time cost; a number of lane changes; or a number of turns.

F. The system as any of paragraphs A-D recite, wherein the instructions further comprising: determining a critical point based on the blocked portion; and determining to stop the autonomous vehicle at least a threshold distance away from the critical point prior to receiving the instruction.

G. A method comprising: detecting, based at least in part on sensor data associated with an autonomous vehicle, a portion of an environment that impedes a planned path of the autonomous vehicle; determining a semantic classification associated with the portion of the environment; transmitting, to one or more remote computing devices, a re-routing request comprising the semantic classification; receiving, from the one or more remote computing devices, an instruction associated with navigating the autonomous vehicle around the portion of the environment, the instruction comprising an alternative route determined from a plurality of alternative routes; and controlling, based at least in part on the instruction, the autonomous vehicle to navigate around the portion of the environment.

H. The method as paragraph G recites, further comprising: determining that the semantic classification comprises one of a subset of classes; and determining one or more alternative paths based at least in part on a determination that the semantic classification comprises the one of the subset of classes; wherein the rerouting request comprises one or more alternative paths.

I. The method as paragraph G or H recites, further comprising: determining that the autonomous vehicle is operating in a first lane; determining that the planned path of the vehicle includes a lane change into a second lane that is different from the first lane; determining that the portion of the environment that impedes the planned path of the autonomous vehicle is associated with the second lane proximate the autonomous vehicle; and determining, based on an overlap between the portion of the environment and the planned path, that the autonomous vehicle is unable to perform the lane change, wherein the re-routing request is transmitted based on a determination that the autonomous vehicle is unable to perform the lane change.

J. The method as any of paragraphs G-I recites, further comprising: determining that the autonomous vehicle is operating in a first lane; determining that the planned path of the vehicle includes a junction linking the first lane to a second lane; determining that the portion of the environment impedes the planned path of the autonomous vehicle is associated with the junction or the second lane; and determining that the autonomous vehicle is unable to travel through the junction, wherein the re-routing request is transmitted based on a determination that the autonomous vehicle is unable to travel through the junction.

K. The method as any of paragraphs G-J recites, wherein the one or more remote computing devices are associated with a remote operator and the alternative path comprises at least one of: a first path selected by the remote operator from one or more alternative paths provided in the re-routing request; or a second path that is generated by the remote operator and is different from the one or more alternative paths.

L. The method as any of paragraphs G-K recites, wherein the one or more alternative paths are determined based at least in part on one or more of: a time cost; a number of turns; or a number of lane changes.

M. The method as any of paragraphs G-L recites, further comprising: determining a critical point based on the portion of the environment that impedes the planned path of the autonomous vehicle; and determining to stop the autonomous vehicle at least a threshold distance away from the critical point.

N. A non-transitory computer-readable media storing instructions that, when executed by one or more processors, cause one or more computing devices to perform operations comprising: detecting, based at least in part on sensor data associated with an autonomous vehicle, a portion of an environment that impedes a planned path of the autonomous vehicle; determining a semantic classification associated with the portion of the environment; transmitting, to one or more remote computing devices, a re-routing request comprising the semantic classification; receiving, from the one or more remote computing devices, an instruction associated with navigating the autonomous vehicle around the portion of the environment, the instruction comprising an alternative route determined from a plurality of alternative routes; and controlling, based at least in part on the instruction, the autonomous vehicle to navigate around the portion of the environment.

O. The one or more non-transitory computer-readable media as paragraph N recites, the instruction comprising: determining that the semantic classification comprises one of a subset of classes; determining one or more alternative paths based at least in part on a determination that the semantic classification comprises the one of the subset of classes; wherein the rerouting request comprises one or more alternative paths.

P. The one or more non-transitory computer-readable media as paragraph N or O recites, wherein the instruction comprising: determining that the autonomous vehicle is operating in a first lane; determining that the planned path of the autonomous vehicle includes a lane change into a second lane that is different from the first lane; determining that the portion of the environment that impedes the planned path of the autonomous vehicle is associated with the second lane proximate the vehicle; and determining, based on an overlap between the portion of the environment and the planned path, that the autonomous vehicle is unable to perform the lane change; wherein the re-routing request is transmitted based on a determination that the autonomous vehicle is unable to perform the lane change.

Q. The one or more non-transitory computer-readable media as any of paragraphs N-P recite, wherein the instruction comprising: determining that the autonomous vehicle is operating in a first lane; determining that the planned path of the vehicle include a junction linking the first lane to a second lane; determining that the portion of the environment impedes the planned path of the autonomous vehicle is associated with the junction or the second lane; and determining that the autonomous vehicle is unable to travel through the junction, wherein the re-routing request is transmitted based on a determination that the autonomous vehicle is unable to travel through the junction.

R. The one or more non-transitory computer-readable media as any of paragraphs N-Q recite, wherein the one or more remote computing devices are associated with a remote operator and the operations further comprising at least one of: an indication of selection of an alternative path of one or more alternative paths; or a re-route path that is generated by the remote operator and is different from the one or more alternative paths; or an indication of the autonomous vehicle to continue to wait an additional period of time.

S. The one or more non-transitory computer-readable media as any of paragraphs N-R recite, wherein the one or more alternative paths are determined based at least in part on one or more of: a time cost; a number of turns; or a number of lane changes.

T. The one or more non-transitory computer-readable media as any of paragraphs N-S recite, the operations further comprising: determining a critical point based on the portion of the environment that impedes the planned path of the autonomous vehicle; and determining to stop the autonomous vehicle at least a threshold distance away from the critical point.

While the example clauses described above are described with respect to one particular implementation, it should be understood that, in the context of this document, the content of the example clauses may also be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by the one or more processors, wherein the instructions, when executed, cause the system to perform operations comprising:
  detecting, based at least in part on sensor data associated with an autonomous vehicle, a blocked portion in an environment of the autonomous vehicle;
  determining that the blocked portion impedes a planned path of the autonomous vehicle;
  determining a semantic classification associated with the blocked portion of the environment;
  determining, based at least in part on determining that the blocked portion impedes the planned path, a plurality of alternative paths to navigate the autonomous vehicle around the blocked portion, wherein determining that the blocked portion impedes the planned path is based at least in part on the semantic classification associated with the blocked portion;
  transmitting, to one or more remote computing devices, a re-routing request and alternative routing data representing the plurality of alternative paths;
  receiving, from the one or more remote computing devices, an instruction associated with navigating the autonomous vehicle around the blocked portion; and
  controlling, based at least in part on the instruction, the autonomous vehicle to navigate around the blocked portion.

2. The system of claim 1, wherein
the semantic classification comprises one of a subset of classes; and
wherein determining the plurality of alternative paths is further based at least in part on a determination that the semantic classification comprises the one of the subset of classes.

3. The system of claim 1, the operations further comprising:
determining that the autonomous vehicle is operating in a first lane;
determining that the planned path of the autonomous vehicle includes a lane change into a second lane that is different from the first lane;
determining that the blocked portion is located in the second lane proximate the autonomous vehicle; and
determining, based on an overlap between the blocked portion and the planned path, that the autonomous vehicle is unable to perform the lane change.

4. The system of claim 1, wherein the one or more remote computing devices are associated with a remote operator and the instruction comprises at least one of:
an indication of determination of an alternative path of the plurality of alternative paths;
a re-route path that is generated by the remote operator and is different from the plurality of alternative paths; or
an indication for the autonomous vehicle to continue to wait an additional period of time.

5. The system of claim 1, wherein the plurality of alternative paths are determined based at least in part on one or more of:
a time cost;
a number of lane changes; or
a number of turns.

6. The system of claim 1, the operations further comprising:
determining a critical point based on the blocked portion; and
determining to stop the autonomous vehicle at least a threshold distance away from the critical point prior to receiving the instruction.

7. A method comprising:
detecting, based at least in part on sensor data associated with an autonomous vehicle, a portion of an environment that impedes a planned path of the autonomous vehicle;
determining a semantic classification associated with the portion of the environment;
transmitting, to one or more remote computing devices, a re-routing request comprising the semantic classification;
receiving, from the one or more remote computing devices, an instruction associated with navigating the autonomous vehicle around the portion of the environment, the instruction comprising an alternative route determined from a plurality of alternative routes, wherein the instruction is based at least in part on the semantic classification associated with the portion of the environment; and
controlling, based at least in part on the instruction, the autonomous vehicle to navigate around the portion of the environment.

8. The method of claim 7, further comprising:
determining that the semantic classification comprises one of a subset of classes; and
wherein the re-routing request comprises the plurality of alternative routes.

9. The method of claim 7, further comprising:
determining that the autonomous vehicle is operating in a first lane;
determining that the planned path of the autonomous vehicle includes a lane change into a second lane that is different from the first lane;
determining that the portion of the environment that impedes the planned path of the autonomous vehicle is associated with the second lane proximate the autonomous vehicle; and
determining, based on an overlap between the portion of the environment and the planned path, that the autonomous vehicle is unable to perform the lane change, wherein the re-routing request is transmitted based on a determination that the autonomous vehicle is unable to perform the lane change.

10. The method of claim 7, further comprising:
    determining that the autonomous vehicle is operating in a first lane;
    determining that the planned path of the autonomous vehicle includes a junction linking the first lane to a second lane;
    determining that the portion of the environment impedes the planned path of the autonomous vehicle is associated with the junction or the second lane; and
    determining that the autonomous vehicle is unable to travel through the junction,
    wherein the re-routing request is transmitted based on a determination that the autonomous vehicle is unable to travel through the junction.

11. The method of claim 7, wherein the one or more remote computing devices are associated with a remote operator and the alternative route comprises at least one of:
    a first route selected by the remote operator from one or more alternative routes provided in the re-routing request; or
    a second route that is generated by the remote operator and is different from the one or more alternative routes.

12. The method of claim 7, wherein the plurality of alternative routes are determined based at least in part on one or more of:
    a time cost;
    a number of turns; or
    a number of lane changes.

13. The method of claim 7, further comprising:
    determining a critical point based on the portion of the environment that impedes the planned path of the autonomous vehicle; and
    determining to stop the autonomous vehicle at least a threshold distance away from the critical point.

14. A non-transitory computer-readable media storing instructions that, when executed by one or more processors, cause one or more computing devices to perform operations comprising:
    detecting, based at least in part on sensor data associated with an autonomous vehicle, a portion of an environment that impedes a planned path of the autonomous vehicle;
    determining a semantic classification associated with the portion of the environment that impedes the planned path of the autonomous vehicle;
    transmitting, to one or more remote computing devices, a re-routing request comprising the semantic classification;
    receiving, from the one or more remote computing devices, an instruction associated with navigating the autonomous vehicle around the portion of the environment, the instruction comprising an alternative route determined from a plurality of alternative routes, wherein the instruction is based at least in part on the semantic classification associated with the portion of the environment; and
    controlling, based at least in part on the instruction, the autonomous vehicle to navigate around the portion of the environment.

15. The non-transitory computer-readable media of claim 14, the operations further comprising:
    determining that the semantic classification comprises one of a subset of classes; and
    wherein the re-routing request comprises the plurality of alternative routes.

16. The non-transitory computer-readable media of claim 14, the operations further comprising:
    determining that the autonomous vehicle is operating in a first lane;
    determining that the planned path of the autonomous vehicle includes a lane change into a second lane that is different from the first lane;
    determining that the portion of the environment that impedes the planned path of the autonomous vehicle is associated with the second lane proximate the autonomous vehicle; and
    determining, based on an overlap between the portion of the environment and the planned path, that the autonomous vehicle is unable to perform the lane change,
    wherein the re-routing request is transmitted based on a determination that the autonomous vehicle is unable to perform the lane change.

17. The non-transitory computer-readable media of claim 14, the operations comprising:
    determining that the autonomous vehicle is operating in a first lane;
    determining that the planned path of the autonomous vehicle include a junction linking the first lane to a second lane;
    determining that the portion of the environment impedes the planned path of the autonomous vehicle is associated with the junction or the second lane; and
    determining that the autonomous vehicle is unable to travel through the junction,
    wherein the re-routing request is transmitted based on a determination that the autonomous vehicle is unable to travel through the junction.

18. The non-transitory computer-readable media of claim 14, wherein the one or more remote computing devices are associated with a remote operator and the operations further comprise at least one of:
    an indication of selection of an alternative route of one or more alternative routes; or
    an updated route that is generated by the remote operator and is different from the plurality of alternative routes; or
    an indication of the autonomous vehicle to continue to wait an additional period of time.

19. The non-transitory computer-readable media of claim 14, wherein the plurality of alternative routes are determined based at least in part on one or more of:
    a time cost;
    a number of turns; or
    a number of lane changes.

20. The non-transitory computer-readable media of claim 14, the operations further comprising:
    determining a critical point based on the portion of the environment that impedes the planned path of the autonomous vehicle; and
    determining to stop the autonomous vehicle at least a threshold distance away from the critical point.

* * * * *